United States Patent [19]

Ghiasi et al.

[11] Patent Number: 4,950,490

[45] Date of Patent: Aug. 21, 1990

[54] TACO SHELL AND METHOD OF MANUFACTURE

[75] Inventors: Katy Ghiasi, St. Anthony Village; Leslie L. Skarra, Tonka Bay, both of Minn.

[73] Assignee: The Pillsbury Company, Pillsbury, Minn.

[21] Appl. No.: 82,969

[22] Filed: Aug. 6, 1987

Related U.S. Application Data

[63] Continuation of Ser. No. 791,200, Oct. 25, 1985, abandoned.

[51] Int. Cl.$^5$ ............................................. A21D 13/00
[52] U.S. Cl. .................................. 426/138; 426/440; 426/549
[58] Field of Search ............... 426/138, 439, 549, 440; 99/448

[56] References Cited

U.S. PATENT DOCUMENTS

| | | |
|---|---|---|
| 2,664,812 | 1/1954 | Molina .................................. 99/448 |
| 3,655,385 | 4/1972 | Rubio ................................... 426/331 |
| 3,672,912 | 6/1972 | Rubio ................................... 426/331 |
| 3,687,685 | 8/1972 | Rubio ................................... 426/331 |
| 3,690,895 | 9/1972 | Amadon et al. ...................... 426/439 |
| 3,694,224 | 9/1972 | Rubio ................................... 426/331 |
| 3,709,696 | 1/1973 | Rubio ................................... 426/331 |
| 3,853,998 | 12/1974 | Rubio ................................... 426/532 |
| 3,859,449 | 1/1975 | Rubio ................................... 426/323 |
| 3,930,049 | 12/1975 | Mattson ............................... 426/439 |
| 4,170,659 | 10/1979 | Totino et al. ........................ 426/440 |
| 4,241,106 | 12/1980 | Tims ..................................... 426/549 |

*Primary Examiner*—George Yeung
*Attorney, Agent, or Firm*—Robert J. Lewis

[57] ABSTRACT

A taco shell with improved texture and resistance to fracture while eating is provided. A taco shell is formed from a cereal grain, for example, wheat or corn. During cooking, the shell develops a delaminated structure and is cooked sufficiently to make a rigid friable shell in the desired shape. By controlling the delaminated structure and final plasticizer content, collapse while being baked is reduced and a light, crisp, tender and reduced fracture taco shell is obtained.

31 Claims, No Drawings

TACO SHELL AND METHOD OF MANUFACTURE

This application is a continuation of application Ser. No. 791,200, filed Oct. 25, 1985, now abandoned.

BACKGROUND

In recent years, the popularity of Mexican food has seen a phenomenal increase. However, the manufacture and distribution of the shells used for these foods, in general, has not changed. Also, the nature of the shells themselves has not changed or improved to any great degree. The same problem that plaqued shells like those used for tacos are still problems today. One problem with taco shells has been their coarse, tough texture and another, their propensity to fracture upon consumption, making filled tacos lower in quality and difficult to eat. With the growth of interest in Mexican food, the desire for improved products has grown. Because of the competition between various food products, some of the more frequent or new consumers of Mexican foods find the shells less desirable or unacceptable and will either not buy the Mexican products or consume less because of other higher quality alternative foods.

To meet consumer needs, it is the object of this invention to solve the problem of the touch, coarse texture and decrease fracturing in the cooked taco shells.

By manufacturing a taco shell having a delaminated structure as hereinafter described and having a prescribed level of total plasticizer in the product after cooking, the problems with texture and fracturing can be significantly improved. The invention provides a taco shell with improved lightness and crispness and even, more importantly, tenderness and is less prone to fracture during eating.

DETAILED DESCRIPTION

A taco shell can be made from any starch source, e.g., cereal grain but preferably is made from corn flour, wheat flour, or a combination of these with each other and/or other cereal grains. The formula for the shell includes starch e.g. cereal flour, water and other ingredients such as salt, flavors, preservatives, gums, fat, dough conditioners, and leavenings, if desired.

In the present invention, a taco shell is made by mixing the flour in ratio to plasticizer(s) in a specified amount to form a plastic mass having the rheological characteristics needed for subsequent processing. After mixing, the dough is transferred to a sheeting line and is formed into a continuous web, for example, by extruding. The formed web or sheet is then sheeted and cut into discrete pieces e.g. round discs. The trim from between the pieces and the edges can be returned to the extruder for reuse.

The cut pieces are then preferably baked in order to set the structure adequately for frying. The shell, though, is still soft enough to be bent to a desired shape for frying. During baking it is preferred that the shell be turned so that both sides will be baked. After coming out of the oven, the shells are indexed for feeding to the fryer.

The shells are then formed into a desired shape, if desired, for example, they are folded and constrained in the desired U-shape before immersion into the frying oil. This forming step is well known in the industry. The shells are fried until a rigid structure is set. The fried shells are then removed from the fryer, preferably de-oiled, cooled and packaged. Preferably, the shells after cooking and cooling are stored at about 40° F. (4.5° C.) until they are to be consumed.

The crisp and light texture after consumer cooking is attributed to the controlled delamination of the shell. Taco blistering is not new, however, in the past, the industry actively sought to avoid creation of large and/or high levels of blisters because it was felt that blistered products were more fragile and thus more subject to fracture or breakage during distribution or consumption. A degree of blistering from time to time still occurs but is limited in amount and size.

Now, however, it has been found that by having a controlled but highly delaminated structure that a superior taco shell can be produced. Control of the delamination can be by docking or by control of the coarse and fine particles in the flour.

The flour can be from any starch source and the preferred flour is corn or wheat or a mixture of corn and wheat; however, any cereal grain can be used independently or in combination. It is preferred that at least a majority of the flour be from one grain, e.g. wheat or corn, more preferably at least 75% and most preferably at least about 90%. The flour is preferably a mixture of coarse and fine particles, particularly when corn is used or other low gluten flour (i.e., below about 4% gluten by weight of flour). In this case the flour has a particle size distribution (by weight) of a minimum of about 5% and preferably approximately 5% to about 20% on USSS 50 and a minimum of about 20% and preferably about 20% to 55% on USSS 100 and the remainder is finer—using RoTap Granulation Procedure.

Flour is present with plasticizer in relative amounts to form a machinable dough. The flour, on a dry basis, is present in an amount such that the cooked shell contains at least about 25% and preferably at least about 30% starch by weight and preferably flour is present in the range of between about 40% and about 65%, preferably in the range of between about 43% and about 60%, and more preferably in the range of between about 45% and about 55% by weight of dough.

Plasticizer as used herein is a material, generally liquid, incorporated in a polymer such as flour to increase the workability, flexibility or extensibility changing the rheological character of the flour to a viscous plastic mass. The preferred plasticizers include volatilizable and non volatilizable substances such as water and fat with a combination preferred. Volatilizable plasticizing liquid or substance as used herein has a vaporization temperature at standard pressure of less than 120° C. and non volatilizable plasticizing liquid or substance as used herein has a vaporization temperature at standard pressure of more than 120° C. The preferred volatilizable liquid is water but could include alcohol and the preferred non volatilizable liquid are fats such as shortening, oil and/or polyhydric alcohols. Total volatilizable plasticizer including water present in the dough components, preferably water, is present in the dough in the range of between about 30% and about 57%, preferably in the range of between about 35% and about 54%, and most preferably in the range of between about 35% and about 52.5% by weight of dough. For low gluten flour doughs, total volatilizable plasticizer, preferably water, is present in the range of between about 42% and about 57%, preferably in the range of between about 48% and about 54%, and more preferably in the range of between about 50.5% and about 52.5% by weight of dough. For high gluten flour doughs, total volatilizable plasticizer, preferably water, is present in the range of between about 30% and about 50%, preferably in the range of between about 35% and about 45%, and more preferably in the range of between about 35% and about 38% by weight of dough. The total non volatilizable plasticizer, preferably fat, is in the range of between about 2% and about 20%, preferably in the range of between about 6% and about 14% and more preferably in the range of between about 8% and about 12% by weight of dough. When polyhydric alcohol, for example glycerol and/or sorbitol, is used in addition to fat as a portion of the nonvolatilizable plasticizer it is present in the range of between 0% and about 3%, preferably in the range of between about 0% and about 2% and more preferably in the range of between about 1% and about 2% by weight of dough and the fat is present in the range of between about 2% and about 17%, preferably in the range of between about 6% and about 12% and more preferably in the range of between about 7% and about 10% by weight of dough. The total plasticizer content is in the range of between about 35% and about 65%, preferably in the range of between about 37% and about 61% and more preferably in the range of between about 45% and about 55% by weight of dough.

The other ingredients, if used, may be present in the following approximate percentages: salt 0.5%–1.5%, gum 0.1%–0.4%, preservatives 0.1%–0.3% by weight and flavors as desired. The preferred ingredients are: fat—hydrogenated vegetable shortening; polyhydric alcohol—glycerol for high gluten flour or low corn flour, sorbitol for high corn flour; gum—HPMC (hydroxypropyl methyl cellulose) or CMC (carboxy methyl cellulose); and corn flour or a strong wheat flour.

Flour is the key structural component and water is used to hydrate the flour particles, making it into a cohesive mass. Salt is primarily a flavor enhancer and imparts taste to the product.

The flour, plasticizer and other ingredients, if desired, are mixed in a suitable mixer to form a machinable dough. The rheology of the dough to be machinable will depend on the type of flour used, other ingredients, mixing conditions and the type of processing equipment used. If a flour contains more than about 4% by weight (hereinafter high gluten flour), on a dry basis, gluten it is desired to process the dough to peak or optimum development. Such a high gluten dough should have a rheology in Brabender unit (B.U.) value in the range of between about 550 and about 1500, preferably in the range of between about 700 and about 1200 and most preferably in a range of between about 850 and about 950. If the flour contains less than about 4% gluten (hereinafter low gluten flour) on a dry basis the dough rheology in B.U. should be in the range of between about 300 and about 1000, preferably in the range of between about 600 and about 900 and most preferably in a range of between about 700 and about 800.

If wheat flour and yeast are used, either a sponge dough method, straight dough method or a brew method can be used to produce the dough. If proofing is desired, it is preferably done after mixing and prior to extruding into a web form, for example, by letting the dough sit in a dough trough for a selected period of time. After mixing, the dough is then formed into a web by an extruder or sheeting rolls as is known in the industry. The web is then conveyed to a sheeter which sheets the dough with a series of sheeting rollers to the desired thickness. The sheeted dough is then cut preferably by rotary cutters into the desired sized and shaped item, e.g., for a taco or salad shell it is round having a diameter of about 125 mm or larger.

The thickness of the cut dough is preferably in the range of between about 0.7 mm and about 1.5 mm, more preferably in the range of between about 0.9 mm and about 1.2 mm, and most preferably in the range of between about 0.8 mm and about 1.0 mm. The unit weight of the cut dough is preferably in the range of about 0.12 to 0.15 gram/cm$^2$.

The cutting leaves trim between the cut shells which can be returned, as is known in the art, back to the extruder or other dough web forming device. With high gluten flour (i.e., above about 4% gluten by weight of flour e.g. wheat-based dough), it is preferred not to exceed more than about 50% by weight of the dough being returned as trim. With corn dough or other low gluten (i.e., less than about 4% gluten by weight of flour) doughs, there generally is no upper limit on the amount of returned trim.

The cut shells are then cooked, preferably baking, in, for example, a one or three pass oven at a temperature in the range of between about 315° C. and about 535° C., preferably in the range of between about 370° C. and about 480° C., and most preferably in the range of between about 420° C. and about 450° C. The heat should be high enough to seal the surface of the dough and form a skin (to help hold in steam) and also to raise the internal temperature of the shell to create vapor e.g. steam in order to initiate delamination e.g. blister formation. The product is baked between about 20 seconds and about 55 seconds, more preferably between about 25 seconds and about 45 seconds, the time of baking being dependent upon the temperature. The shell should be cooked at a high enough temperature for a long enough time to set the structure of the shell without making the shell too friable or rigid or excessively dry. The total volatilizable plasticizer, preferably water, content of the baked shell is in the range of between about 29% and about 42%, preferably in the range of between about 32% and about 38% and more preferably in the range of between about 35% and about 36% by weight of shell. Baked weight of the shell is preferably in the range of between about 0.08 and about 0.11 grams/cm$^2$.

During cooking, the shell experiences rapid surface dehydration, wherein the surface starch granules remain ungelatinized, while the internal starch granules absorb water and become gelatinized (as measured by loss of birefringence) as the internal product temperature rises to the gelatinization temperature of the starch. As internal water is heated, it changes to steam, and if done fast enough, the delaminations or blisters are formed by entrapped steam. The extent of delamination at this point is governed by the rate of skin formation and its structure and the rate of water vaporization. The size and number of blisters can be controlled by the flour granulation, constraint of the shell or docking.

The initially formed delamination structure is further developed by frying. The smaller, discrete blisters formed during the initial cooking step change to a more delaminated structure during frying. During frying, the product loses volatilizable plasticizer, e.g. water, and absorbs oil which results in a more tender texture, fried flavor and rigid and friable structure. The frying temperature should be in the range of between about 160° C. and about 220° C., preferably in the range of between about 175° C. and about 205° C., and most preferably in the range of between about 185° C. and about 195° C.

The preferred frying fat is hydrogenated soy oil with high stability. The time of frying, which is dependent on frying temperature, is in the range of between about 8 seconds and about 25 seconds, preferably in the range of between about 10 and about 20 seconds, and most preferably in the range of between about 12 and about 15 seconds. The product is fried until it will when cooled to room temperature be rigid, i.e. it will break if bent more than about 30 degrees and preferably more than 20 degrees.

It is preferred that the finally cooked product have a moisture content in the range of between about 4% and about 7.5%, preferably in the range of between about 4.5% and about 6.8%, and most preferably in the range of between about 5.25% and about 6.25% by weight of the finally cooked product. Chips (food pieces having an area of less than about 4 in$^2$ [26 cm$^2$]), can have a lower water content in the range of between about 2% and about 3% if they are to be consumed as is. By keeping the total volatilizable plasticizer content above about 4% the shells ae tough which helps prevent breakage during shipping. Further cooking by a consumer to lower this amount to about 2% results in a light, tender and crisp texture.

After frying, the shell is preferably deoiled with forced hot air. After deoiling, the shells contains at least about 25% starch by weight of shells and the non volatilizable plasticizer, preferably fat, content of the shell is in the range of between about 20% and about 28%, preferably in the range of between about 22% and about 26% and most preferably in the range of between about 24% and about 25% by weight of cooked shell. The total plasticizer content of the finished shell is in the range of between about 25% and about 35%, more preferably in the range of between about 27% and about 33% and most preferably in the range of between about 29% and about 31% by weight of cooked product. If the total plasticizer content is too high the product will soften upon heating by a consumer which can result in change of shape, like collapse of the side wall causing loss of appeal and working use difficult. However, use of a former during subsequent cooking can minimize or reduce this problem. The flour is present in the range of between about 62% and about 75%, preferably in the range of between about 64% and about 73% and more preferably in the range of between about 66% and about 71% by weight of fried shell.

The product can then be cooled or can be packaged and then cooled to room temperature. Preferably, the product is stored at about 4.5° C. to preserve its fresh flavor. However, storage at higher temperatures is also possible for lower water activity level (A$_w$) products or products with preservatives.

The product is packaged, preferably in hermetically sealed polyethylene plastic bags, and then packed in a rigid paperboard container to help prevent breakage. Packaging should have barrier properties adequate to maintain the disclosed moisture contents of the cooked shell.

The high moisture content of the fried product provides it with an A$_w$ above a point at which microorganisms will grow. If no preservatives are added it is then preferred to refrigerate the product to provide microbiological stability of the A$_w$ is higher than about 0.65.

It has been found that by having adequate plasticizer content and a delaminated structure as described above, that the product will upon further cooking have a very light, crisp and tender texture, it exhibits increased resistance to fracture while eating, particularly the very long fractures which make tacos so difficult to eat.

Further, the final product has a low density. This light density is due to the delaminated nature of the product having voids in the rigid structure. The maximum height of the delaminated areas (thickness) should not exceed about ⅜ inch (0.95 cm) and preferably should not exceed about ¼ inch (0.63 cm).

Another measure of showing the low density of this product is to determine the height of a known stack of shells and compare it to similar products. The height of a stack of 50 invention pieces was more than 8" whereas similar non-invention shells exhibited values less than 6".

As used herein, delaminated means an area of the shell that has separated into two walls. The walls can be separated by a space or void in between or can be unconnected, except at the peripheral edge, except for small areas such as at docking holes or other means of connection. The delamination can take the form of blisters where the walls are connected only at the peripheral edge. The delamination can also be in a form where the walls are connected together in small areas by docking holes or other means and at the peripheral edges. The delamination can be random or regular, as can be the spots where the walls are connected.

The extent of delamination is important to achieve a tender texture but is preferably limited at the upper end to avoid breakage when friable. The delamination, based on the surface area of the shell, is greater than about 60%, preferably greater than about 75%, and more preferably greater than about 85%. This value is calculated by dividing the total area of the shell that is separated into two walls (with only those separated areas that exceed an area greater than 5 mm$^2$ considered delaminated for the calculations) by the total area of the shell. The average size of the delaminated area(s) should exceed about 5 mm$^2$, preferably greater than about 75 mm$^2$, more preferably greater than about 200 mm$^2$. The average size of the delaminated area(s) is in the range of between about 5 mm$^2$ and about 2600 mm$^2$, preferably in the range of between about 75 mm$^2$ and about 1100 mm$^2$, and more preferably in the range of between about 200 mm$^2$ and about 400 mm$^2$.

In the hinge area of a taco, the shell can have reduced delamination as compared to the two side walls. Reduced delamination here is probably due to the constraint during frying. Because of the water and/or fat in the filling used in a taco or the like, it is not as important to have delamination in this area (about 3-4 cm wide) because these liquids will soften this area. Thus, the above quantification of delamination is not required for this area for a tender, crisp, and light texture, or for fracture resistance.

A fracture starts in the product and tends to go straight from edge to edge. However, in the inventive structure, a crack goes to a delaminated area and then can change direction or terminate. The strength of a delaminated wall, under a biting load, is less than the composite strength of the two walls of a delaminated area or an undelaminated area, thus helping to reduce fracture breakage and provides a lighter texture because of reduced strength of the delaminated wall.

The shell can be prepared by the consumer for consumption by one of the following methods. The shell as it comes from the package can be heated directly by the consumer on a cookie sheet. This method of preparation is simple and convenient and will result in an extra crispy texture. The fillings components will be added after reheating. The moisture content of the shell is preferred to be less than about 7.5% if this method of preparation is going to be used by the consumer. Shells with higher moisture content can collapse during reheating and can't be opened up for addition of filling. If the consumer desires a less crisp texture, they can then cook the shell by first filling the shell with a food filling, for example, meat and cheese, and baking the shell and filling in the oven until the shell is done. The shell can also be baked in an oven at home over a former, particularly if the moisture content is greater than 7.5%. The heat will allow the shell to soften and drape over the former. For example, a typical "U" shaped taco, or a taco salad shell. The baking is continued until the shell reaches the desired degree of crispness. Preferably when the shell is filled prior to baking, the baking temperature of the oven is between about 160° C. and about 230° C. until crisp. When the shell is desired to be heated without filling, it is preferred that the baking temperature of the oven be between about 160° C. and about 190° C. until friable or crisp as described above.

What is claimed is:

1. A cooked and friable starch based food item made from flour, said food item including at least one delaminated portion having two walls defining a space therebetween with said walls being connected at the periphery of the space, the area of the delaminated portion being at least about 60% of the surface area of the food items, said food items having plasticizer including volatilizable plasticizer and nonvolatizable plasticizer, said volatilizable plasticizer content above about 4% by weight of food item and a total plasticizer content of less than about 35% by weight of food item.

2. A food item as set forth in claim 1 wherein the average size of the at least one delaminated portion exceeds about 5 mm$^2$.

3. A food item as set forth in claim 2 wherein the food item has a plurality of delaminated portions.

4. A food item as set forth in claim 1 wherein the average size of the delaminated portions is in the range of between about 5 mm$^2$ and about 2600 mm$^2$.

5. A food item as set forth in claim 4 wherein the average size of the delaminated portions is in the range of between about 75 MM$^2$ and about 1100 mm$^2$.

6. A food item as set forth in claim 5 wherein the average size of the delaminated portions is in the range of between about 200 mm$^2$ and about 400 mm$^2$.

7. A food item as set forth in claim 2 wherein the volatilizable plasticizer is present in the range of between about 4% and about 7.5% by weight of food item.

8. A food item as set forth in claim 7 wherein the volatilizable plasticizer is present in the range of between about 4.5% and about 6.8% by weight of food item.

9. A food item as set forth in claim 8 wherein the volatilizable plasticizer is present in the range of between about 5.25% and about 6.25% by weight of food item.

10. A food item as set forth in claim 2, 7, 8 or 9 wherein the food shell contains non-volatilizable plasticizer wherein the amount of volatilizable plasticizer and non-volatilizable plasticizer is in the range of between about 25% and about 35% by weight of food item.

11. A food item as set forth in claim 10 wherein the total plasticizer content is in the range of between about 27% and about 33% by weight of food item.

12. A food item as set forth in claim 11 wherein the total plasticizer content is in the range of between about 29% and about 31% by weight of food item.

13. A food item as set forth in claim 4 wherein the volatilizable plasticizer is present in the range of between about 4% and about 7.5% by weight of food item and the food item also contains non-volatilizable plasticizer wherein the amount of volatilizable plasticizer and non-volatilizable plasticizer is present in the range of between about 25% and about 35% by weight of food item.

14. A food item as set forth in claim 5 wherein the food item has a volatilizable plasticizer content in the range of between about 4.5% and about 6.8% by weight of food item and also contains non volatilizable plasticizer wherein the total amount of volatilizable plasticizer and non volatilizable plasticizer is in the range of between about 27% and about 33% by weight of food item.

15. A food item as set forth in claim 6 wherein the volatilizable plasticizer is present in the range of between about 5.25% and about 6.25% by weight of food item and also contains non volatilizable plasticizer wherein the total amount of volatilizable plasticizer and non volatilizable plasticizer is in the range of between about 29% and about 31% by weight of food item.

16. A food item as set forth in claim 1, 2 or 3 wherein the food item has a plurality of randomly positioned nondelaminated portions.

17. A food item as set forth in claim 13, 14, or 15 wherein the flour is comprised of at least about 50% by weight corn.

18. A food item as set forth in claim 17 wherein the flour has a particle size distribution of at least about 5% on USSS 50 and at least about 20% on USSS 100.

19. A food item as set forth in claim 18 wherein the flour is comprised of at least about 75% by weight corn.

20. A food item as set forth in claim 13, 14 or 15 wherein the flour is comprised of at least about 50% by weight of one cereal grain.

21. A food item as set forth in claim 20 wherein the flour is comprised of at least about 75% by weight of one cereal grain.

22. A food item as set forth in claim 1 or 2 wherein the food item is a taco shell.

23. A food item as set forth in claim 1 or 2 wherein the food item is cooked at least partially by frying in fat.

24. A food item as set forth in claim 23 wherein the nonvolatilizable plasticizer includes fat, said nonvolatilizable plasticizer is present in the range of between about 20% and about 28% by weight of said food item.

25. A food item as set forth in claim 24 wherein the volatilizable plasticizer includes water which is present in the range of between about 4% and about 7.5% by weight of said food item.

26. A chip which includes at least one delaminated portion having two walls defining a space therebetween with said walls being connected at the periphery of the space, the area of the delaminated portion being at least about 60% of the surface area of the chip and said chip having a water content in the range of between about 2% and about 3% by weight of said chip.

27. A process of making a cooked and friable starch based food item, said process including:
   (a) forming dough with starch containing flour and at least one plasticizer
   (b) forming said dough into a dough piece; and (c) cooking said dough piece until friable and, during cooking, forming at least one delaminated portion in the piece, said delaminated portion having two walls defining a space therebetween with said walls being connected at the periphery of the space, the area of the delaminated portion being at least about 60% of the area of the food item, said food item having a volatilizable plasticizer in an amount above about 4% by weight of food item.

28. A process as set forth in claim 27 wherein the average size of the delaminated portion exceeds about 5 mm$^2$.

29. A process as set forth in claim 28 wherein the food item has a plurality of said delaminated portions.

30. A process as set forth in claim 27, 28 or 29 wherein said cooking includes a frying step.

31. A process as set forth in claim 30 wherein said cooking includes a baking step prior to frying and wherein said delaminated portions are at least partially formed during baking.

* * * * *